United States Patent
Cawlfield et al.

(10) Patent No.: US 9,434,616 B2
(45) Date of Patent: Sep. 6, 2016

(54) SODIUM HYPOCHLORITE COMPOSITION AND METHOD OF STORING AND TRANSPORTING SODIUM HYPOCHLORITE

(71) Applicant: Olin Corporation, St. Louis, MO (US)

(72) Inventors: David W. Cawlfield, Athens, TN (US); Randall Taylor Morris, Benton, TN (US); Richard Carl Ness, Cleveland, TN (US); Leonard L. Scott, Daphne, AL (US); Sanders Harrison Moore, Ooltewah, TN (US); Awuri Priye Asuru, Cleveland, TN (US)

(73) Assignee: OLIN CORPORATION, St. Louis, MO (US)

( * ) Notice: Subject to any disclaimer, the term of this patent is extended or adjusted under 35 U.S.C. 154(b) by 211 days.

(21) Appl. No.: 14/067,672

(22) Filed: Oct. 30, 2013

(65) Prior Publication Data
US 2014/0117278 A1   May 1, 2014

Related U.S. Application Data

(60) Provisional application No. 61/720,464, filed on Oct. 31, 2012.

(51) Int. Cl.
*C01B 11/06* (2006.01)

(52) U.S. Cl.
CPC ............ *C01B 11/062* (2013.01); *C01B 11/068* (2013.01)

(58) Field of Classification Search
None
See application file for complete search history.

(56) References Cited

U.S. PATENT DOCUMENTS

| | | | |
|---|---|---|---|
| 4,248,848 A | 2/1981 | Murakami et al. | |
| 4,428,918 A * | 1/1984 | Verlaeten | C01B 11/062 422/147 |
| 5,194,238 A | 3/1993 | Duncan et al. | |
| 2010/0084605 A1* | 4/2010 | Bakkenes | B01J 8/22 252/187.26 |

FOREIGN PATENT DOCUMENTS

| | | |
|---|---|---|
| EP | 0099152 A1 | 1/1984 |
| JP | 2000290003 A | 10/2000 |
| WO | WO-9217399 A1 | 10/1992 |
| WO | WO-2008082626 A1 | 7/2008 |

OTHER PUBLICATIONS

European Search Report for corresponding application EP13850128.3 Dated: May 11, 2016 pp. 7.
Feise, HJ, "Handling of.Solids—Transport and Storage" Chemical Engineering and Chemical Process Technology, Encyclopedia of Life Support Systems, vol. 2 (2011).
Patience, DB, "Crystal Engineering through Particle Size and Shape Monitoring, Modeling, and Control" Dissertation—University of Wisconsin (2002).
Zoller, U., et al. "Inorganic Bleaches: Production of Hypochlorite" Handbook of Detergents, Part F: Production, Surfactant Science Series, vol. 142 (2009).
International Search Report and Written Opinion for PCT/US2013/067571 Date: Aug. 19, 2014 pp. 13.
International Preliminary Report on Patentability for PCT/US2013/067571 Dated: May 5, 2015 pp. 6.

* cited by examiner

*Primary Examiner* — Joseph D Anthony
(74) *Attorney, Agent, or Firm* — Harness, Dickey & Pierce, P.L.C.

(57) ABSTRACT

A sodium hypochlorite composition comprising between about 25% and about 40% sodium hypochlorite, in the form of a slurry of sodium hypochlorite pentahydrate crystals in a mother liquor saturated in sodium hypochlorite. The composition can include sodium chloride, and an alkai stabilizer such as sodium hydroxide and sodium carbonate. The slurry is preferably between about −15° C. and about 10° C. A method of transporting or storing sodium hypochlorite is also provided in which the sodium hypochlorite is in the form of a slurry of sodium hypochlorite pentahydrate crystals in a mother liquor saturated in sodium hypochlorite. The composition can include sodium chloride, and an alkali stabilizer such as sodium hydroxide and sodium carbonate. The slurry is preferably between about −15° C. and about 10° C.

13 Claims, No Drawings

SODIUM HYPOCHLORITE COMPOSITION AND METHOD OF STORING AND TRANSPORTING SODIUM HYPOCHLORITE

CROSS-REFERENCE TO RELATED APPLICATIONS

This application claims priority to U.S. Provisional Patent Application Ser. No. 61/720,464, filed Oct. 31, 2012. The entire disclosure of the above-referenced application is incorporated herein.

FIELD

The present disclosure relates to a sodium hypochlorite composition and method of storing and transporting sodium hypochlorite.

BACKGROUND

This section provides background information related to the present disclosure which is not necessarily prior art.

There are many uses for sodium hypochlorite, commonly known as bleach in industrial, utility, and residential applications. In many large-scale applications, sodium hypochlorite has traditionally been produced on-site by combining chlorine, alkali, and water. Chlorine is conventionally provided as liquefied chlorine gas in portable cylinders or in rail cars. However there are certain risks and costs associated with the handling, shipping, and storage of liquefied chlorine. An alternative is to handling liquefied chlorine is to produce the chlorine or sodium hypochlorite by electrolysis. Direct electrolysis is described in prior art as the conversion of sodium chloride-containing brine to a solution containing of sodium hypochlorite in an undivided electrochemical cell. This process has the advantage of producing sodium hypochlorite without the transport of gaseous chlorine and solutions containing caustic soda. The principal disadvantage of on-site direct electrolysis to make bleach is that high conversion of salt to bleach is not achievable simultaneously with high energy efficiency. Another problem encountered with direct electrolysis is the limited life of electrodes used in the electrolysis. Yet another problem with direct electrolysis is the undesirable formation of chlorate, either by thermal decomposition of hypochlorite solutions or by the electro-oxidation of hypochlorite at the anode.

Another alternative process for the production of sodium hypochlorite is indirect. This process begins with electrolysis of salt to produce chlorine and caustic soda which are later recombined chemically to produce bleach. Indirect electrolysis is typically performed in a membrane-cell electrolyzer, and can achieve high conversion of salt and high energy efficiency. The chlorine and caustic soda co-produced by this means can be combined in a suitable reactor to produce bleach solutions. However, the indirect production of bleach requires substantial investment in equipment, as well as equipment for safely handling gaseous chlorine. The indirect production of bleach is thus unsuitable for many on-site applications at the point of use, but is the preferred means to produce bleach at an industrial scale. Such production is typically optimized based upon proximity to electric power supply and salt availability, so it is typically uneconomic to produce bleach by indirect electrolysis at many locations where it is needed.

Transportation of bleach solutions is limited by the solubility of sodium hypochlorite in water and by the limited stability of these solutions. Transportation cost of bleach solutions of 15-25% concentrations is higher than the cost of transporting the reactants (50% caustic soda and liquefied chlorine gas) used to produce bleach conventionally, because more mass and volume must be transported per unit of sodium hypochlorite delivered.

SUMMARY

This section provides a general summary of the disclosure, and is not a comprehensive disclosure of its full scope or all of its features.

The inventors have learned that sodium hypochlorite pentahydrate, a salt containing sodium hypochlorite and water, is stable at temperatures below about 30° C. At higher temperatures, this hydrate melts, becoming a strong solution of sodium hypochlorite and water. However the sodium hypochlorite pentahydrate most frequently forms acicular (long needle shaped) crystals. Sodium hypochlorite compositions made exclusively of sodium hypochlorite pentahydrate crystals have an undesirably low bulk density arising from this crystal shape because randomly-oriented needle-shaped crystals do not pack tightly together. Another unexpected problem associated with sodium hypochlorite pentahydrate crystals is that they are subject to rapid decomposition when allowed to come in contact with air. Crystals that come in contact with air can decompose overnight to form a dilute solution containing some bleach and salt, even when low storage temperatures are maintained. The inventors suspect that the rapid decomposition may be caused by contact with carbon dioxide on the surface of the crystals, leading to a low pH environment in which bleach decomposition is rapid. Consistent with this hypothesis, it was observed that crystals produced in a laboratory from alkaline solutions were more sensitive to the presence of air when filtration was conducted in a manner to leave very little alkaline solution remaining on the crystals.

When bleach solutions are produced that contain greater than about 25 wt % sodium hypochlorite, solid sodium hypochlorite pentahydrate crystals can begin to form upon chilling these solutions below about 10° C., although solutions of greater concentration can form pentahydrate crystals at somewhat higher temperatures. However, even at temperatures of 10° C., concentrated sodium hypochlorite solutions decompose more rapidly than desired. Sodium hypochlorite solutions may be prepared at temperatures below the equilibrium point at which sodium hypochlorite pentahydrate crystals will form and maintained without the formation of sodium hypochlorite pentahydrate unless a seed crystal is present. However, in large-scale transportation, the complete absence of seed crystals that can allow formation of sodium hypochlorite pentahydrate cannot be guaranteed. When bleach solutions are chilled to temperatures at which sodium hypochlorite pentahydrate crystallizes and a seed crystal is present, the formation of crystals proceeds to create a network of needle shaped crystals that prevents the material from flowing. This solid is not easily removed from transportation containers. Formation of sodium hypochlorite pentahydrate crystals is an obstacle to the effective and efficient transportation and distribution of sodium hypochlorite solutions at concentrations greater than 25 wt % sodium hypochlorite at temperatures below about 10° C., while at temperatures above 10° C. concentrated bleach solutions lose at least about 12% of their contained bleach to decomposition over a period of 30 days. It can be an advantage that the bleach-containing composition of this invention can be loaded and unloaded from shipping containers as a pumpable paste or slurry. Another advantage is that the slurry may contain more than 25 wt % sodium hypochlorite, so that the total transportation weight and volume is approximately equal to the materials (chlorine and sodium hydroxide) used to produce bleach conventionally. Yet another advantage is that this slurry is stable over a period of time of at least 30 days without losing more than 5% of its contained chlorine value. Yet another advantage of the composition is that it can be diluted to produce bleach at all concentrations of practical use as industrial or commercial bleach products. Yet another advantage of the composition is that after storage at a temperature of −5° Celsius, the chlorate formed by decomposition is lower than amount of chlorate contained in conventional bleach containing 15% sodium hypochlorite stored at 0° Celsius. Yet another advantage of the composition is that it can be produced in large scale at a location where salt and electricity are readily available and distributed to customers over a long distance. Yet another advantage is that in the preferred embodiment of this invention, the pumpable paste can be loaded into insulated containers for transportation that can require less or no refrigeration because the sodium hypochlorite pentahydrate crystals absorb heat energy as they melt so that the temperature increase is less than a bleach solution without crystals.

Generally, embodiments of the present invention provide high concentration sodium hypochlorite compositions for more efficient shipping, storage, and handling. A preferred embodiment of the composition comprises a slurry containing sodium hypochlorite pentahydrate crystals and a mother liquor saturated in sodium hypochlorite. The overall composition preferably comprises between about 25% and about 35% by weight sodium hypochlorite, about 1% to about 10 wt % sodium chloride, and sufficient alkali, e.g. sodium hydroxide and/or sodium carbonate to stabilize the composition. In this preferred embodiment the stabilizing alkali is between about 0.01% and about 3% by weight sodium hydroxide and/or sodium carbonate. The composition is preferably at between about −15° C. and about 10° C. The crystal size is preferably controlled, in the formation or by subsequent action, to maintain a viscosity that allows the composition to be pumped. The crystal length (longest dimension) is preferably less than about 1 mm, and more preferably less than about 0.5 mm, so as to maintain a suitable viscosity.

An unexpected advantage of sodium hypochlorite compositions of at least some preferred embodiments of this invention is that they remain stable in the presence of air because the liquid phase contains sufficient alkalinity to maintain an alkaline environment around the solid phase. Yet another unexpected advantage of at least some embodiments of this invention is that the paste or slurry has a higher shipping density than compositions consisting of only pentahydrate crystals because the void space between crystals is filled by bleach-containing solution. Yet another advantage of at least some embodiments of this invention is that the composition of some of the preferred embodiments of this invention can be maintained at low temperature for a prolonged period of time and remain pumpable, even in temperatures below that at which it was produced.

Another unexpected advantage of at least some preferred embodiments of this invention is improved safety in handling. In general, the corrosivity and reactivity of sodium hypochlorite solutions increases with solution strength. However, in spite of having higher concentration than conventional sodium hypochlorite solutions, the compositions of at least some embodiments of this invention are less reactive (possibly due to their low temperature) and are less likely to splash or contaminate large areas in a spill because they are more viscous. Furthermore, while it has been reported that isolated dry pentahydrate crystals can decompose violently when exposed to shock, no such sensitivity has been observed for the paste of the preferred embodiments of this invention.

Further areas of applicability will become apparent from the description provided herein. The description and specific examples in this summary are intended for purposes of illustration only and are not intended to limit the scope of the present disclosure.

DETAILED DESCRIPTION

Generally, embodiments of the present invention provide high concentration sodium hypochlorite compositions for more efficient shipping, storage, and handling. A preferred embodiment of the composition comprises a slurry containing sodium hypochlorite pentahydrate crystals and a mother liquor saturated in sodium hypochlorite. The overall composition preferably comprises between about 25% and about 40% by weight sodium hypochlorite, about 1% to about 10 wt % sodium chloride, and sufficient alkali, e.g. sodium hydroxide and/or sodium carbonate to stabilize the composition. In this preferred embodiment the stabilizing alkali is between about 0.01% and about 3% by weight sodium hydroxide and/or sodium carbonate. The composition is preferably stored at between about −15° C. and about 10° C. The crystal size is preferably controlled, in the formation or by subsequent action, to maintain a viscosity that allows the composition to be pumped. A viscosity of less than about 100,000 cp is generally preferred. It is also preferable that the slurry does not maintain an angle of repose greater than about 10% when standing. The average crystal size (longest dimension) is preferably less than 1 mm. and more preferably less than 0.5 mm, with an average length to diameter (L/D) ratio that is preferably less than about 20:1, and more preferably less than about 6:1, so as to maintain a suitable viscosity. The hypochlorite content of pure sodium hypochlorite pentahydrate crystals is theoretically 45.27% by weight. However the compositions of the preferred embodiments of this invention preferably contain sufficient liquid phase to form a flowable slurry or paste that allows the composition to be handled easily. The sodium hypochlorite compositions of the preferred embodiments can contain between about 20 wt % and about 80 wt % sodium hypochlorite pentahydrate crystals. The higher concentrations help reduce transportation costs. The ability to load and unload the composition into and out of a tank car as one would conventional liquids is also very convenient and aids the transition of customers from liquids to a more concentrated product. The liquid phase is necessarily saturated in sodium hypochlorite in equilibrium with the solid sodium hypochlorite hydrate phase. The overall range of sodium hypochlorite concentration is preferably between about 25 wt % to about 40 wt %, and more preferably between about 27 wt % to about 37 wt %, and most preferably between about 30 wt % and about 37 wt %.

The liquid phase of the slurry contains salt, to limit solubility of the hydrate at low temperatures so that the decomposition rate in solution is slowed and to prevent the formation of ice, thereby preventing complete solidification of the mixture should cooling occur. The prior art suggests that decomposition of sodium hypochlorite bleach compositions is minimized by the absence of sodium chloride, but here the inventors have found to the contrary, that in a slurry containing sodium hypochlorite pentahydrate crystals, the presence of salt in the liquid phase actually stabilizes the composition and extends the temperature range within which the slurry can be satisfactorily handled by pumping or other conventional means. The overall salt content of the paste is preferably between about 1% and about 10%, depending on the quantity of the sodium hypochlorite pentahydrate crystals in the composition, and the temperature of the composition. At higher concentrations of salt, some salt may be present in solid form, depending on the temperature of the mixture. As the mixture is warmed, some of the hypochlorite crystals will go into solution, but salt crystals will precipitate out. Conversely, salt crystals will dissolve as the mixture is cooled. Optimally, the composition need not contain more salt than will remain in solution over the anticipated storage temperature range of the composition. Precipitation of salt crystals from the slurry is undesirable because salt is denser and will tend to settle to the bottom of the container.

The viscosity of the compositions can be controlled by controlling the crystal size and in particular the length to diameter ration (L/D) of the sodium hypochlorite pentahydrate crystals present. By subjecting blocks of crystallized sodium hypochlorite pentahydrate to mechanical crushing, milling, or abrasion, a slurry can be produced that can be pumped and transferred by hoses or piping, or other similar equipment used to handle conventional sodium hypochlorite solutions. Milling of crystals is performed to reduce the bulk density of the pentahydrate phase. It is believed that when the sodium hypochlorite pentahydrate crystals have an average length to diameter ratio of less than about 20:1, a pumpable slurry can be produced, but at higher L/D ratios, the slurry is less flowable. An Average length to diameter (L/D) ratio is of less than about 6:1 may be even more preferably in certain circumstances Alternatively, or in addition, the crystallization formation conditions can be controlled to produce a desired crystal size and shape without mechanical processing of the crystals' step.

The composition is preferably kept in a temperature range over which at least a portion of the sodium hypochlorite is present as sodium hypochlorite pentahydrate crystals. The low limit of temperature is that at which some water-ice will form when cooled further. This is approximately −17° C. It is anticipated that it would be impractical to create a process to manufacture a composition much below about −15° C. because of the potential to freeze on the surface of heat exchangers used to cool the composition. The upper range of preferred temperature is limited by the desire to minimize decomposition rate and maximize potential storage life of the composition in an insulated container. A practical upper limit of approximately 10° C., and more preferably −0° C. is useful for transportation in an insulated but not refrigerated container.

In the examples that follow, it is demonstrated that slurries containing 31% to 33% sodium hypochlorite by weight and 1.5% to 6.3% by weight sodium chloride can be stored for at least 2 months without appreciable change in composition. These compositions were observed to contain approximately 70% to 90% by mass of settled solids at −5° C. On changing the storage temperature, the exemplary compositions became noticeably thicker at −9° C., and the fraction of settled solids increased, whereas the viscosity decreased as the temperature increased. Over this entire range of temperature, the slurries slumped down and the surface became level after stirring, indicating that a container full of slurry could be emptied entirely by pumping from a container. The compositions containing the most dissolved salt showed the smallest change in observed viscosity and settled solids when the temperature changed.

EXAMPLES

Example 1

A sodium hypochlorite solution was made by chlorinating caustic soda and precipitation sodium chloride. After filtering the sodium chloride, a solution containing approximately 30.5% sodium hypochlorite, 7.1% sodium chloride, and 0.5% sodium hydroxide was obtained at 25° C. This solution can be described as chlorinated caustic filtrate ("CCF"). The CCF was diluted to approximately 28% and chilled to −5° C. with no crystals forming, then seeded with pentahydrate crystals. On seeding, acicular (long needle-shaped penthydrate crystals) formed rapidly. These were filtered and analyzed, the results being provided in Table 1.

TABLE 1

| Batch # | CCF (% NaOCl) | Dilution (% NaOCl) | % NaOCl Crystals | % NaCl | % NaOH | % Na2CO3 | % Yield Crystals |
|---|---|---|---|---|---|---|---|
| 1A | 30.04 | 27.87 | 40.23 | 2.75 | 0.44 | 0.053 | 52.8 |
| 1B | 30.04 | 27.87 | 40.38 | 2.89 | 0.47 | 0.054 | |
| 2A | 29.59 | 28.23 | 39.33 | 3.38 | 0.54 | 0.083 | 52.7 |
| 2B | 29.59 | 28.23 | 39.46 | 2.21 | 0.49 | 0.063 | 52.8 |
| 3A | 30.66 | 27.98 | 38.73 | 3.95 | 0.57 | 0.069 | |
| 3B | 30.66 | 27.98 | 36.69 | 3.63 | 1.01 | 0.044 | |

Example 2

Sodium pentahydrate compositions were prepared from the crystals of Example 1, which was first reanalyzed for hypochlorite (39.51 wt %), and salt (3.45 wt %). No excess alkalinity was found. Each composition was subjected to crushing with a chilled mortar and pestle until no there was no further noticeable change in the subjectively observed viscosity. Slurries were stored in a $CaCl_2$ bath set to −5° C. for the first six (6) weeks of the study. After first six weeks, the temperature of the bath was adjusted approximately every 24 hours in order to observe the effect of temperature on the viscosity of the slurries. Once viscosity studies were completed, slurries were again maintained at −5° C.

| Sample | Pentahydrate Crystals | NaOH | DI $H_2O$ | Added NaCl | Theoretical NaOCl | Actual NaOCl |
|---|---|---|---|---|---|---|
| Slurry 1 | 84.81% of 39.99% NaOCl | 0.15% | 15.74% | 0% | 33.92% | 33.41% |
| Slurry 2 | 80.85% of 39.99% NaOCl | 0.14% | 17.98% | 1.03% | 32.33% | 30.35% |
| Slurry 3 | 81.02% of 40.00% NaOCl | 0.15% | 16.65% | 2.17% | 32.41% | 32.17% |
| Slurry 4 | 79.60% of 40.00% NaOCl | 0.15% | 17.05% | 3.20% | 31.84% | 31.12% |
| Slurry 5 | 79.46% of 39.94% NaOCl | 0.15% | 16.13% | 4.25% | 31.74% | 30.46% |

To sample the compositions, the tapered end of a 5-mL pipet tip was cut off to create a capillary tube, which was pushed straight down into the slurry and removed with the other opening covered with a thumb or finger in order to keep the sampled slurry from falling back into the beaker. The slurry in the pipet tip was transferred to a tared 50-mL centrifuge tube, and the weight of the sampled slurry was recorded. The centrifuge tube was tared again, and deionized H₂O added to dilute the slurry was recorded. The dilution factor was then calculated and used as an appropriate multiplier after each titration. Analyses for NaOCl, NaCl, NaOH, and Na$_2$CO$_3$ were performed using methods typically used for analyzing sodium hypochlorite solutions that were adjusted for the concentrations of the example composition (NaOCl), (NaCl), and (NaOH and Na$_2$CO$_3$). Slurries were tested weekly for NaOCl and NaCl and at the beginning and end of the study for NaOH and Na$_2$CO$_3$. The fraction of solids was also obtained by measuring the heights of the solid and liquid layers of the compositions.

During the first six weeks the compositions were kept at −5° C. and tested weekly for strength and "free" NaCl. The results (Table 2) show minor changes in NaOCl and NaCl over time.

| Date | Temp (° C.) | % Solids | % NaOCl | % NaCl | % NaOH | % Na$_2$CO$_3$ |
|---|---|---|---|---|---|---|
| Slurry 1 | | | | | | |
| Day 1 | −5.0 | 79 | 33.41* | 1.56* | 0.24 | 0.25 |
| Day 2 | −5.0 | 83 | — | — | — | — |
| Day 4 | −5.0 | — | — | — | — | — |
| Day 5 | −5.0 | 83 | 32.79 | 1.71 | — | — |
| Day 19 | −5.0 | 87 | 31.67 | 1.76 | — | — |
| Day 26 | −5.0 | 76 | 32.86 | 1.61 | — | — |
| Day 28 | −5.0 | — | — | — | — | — |
| Day 29 | −5.0 | — | — | — | — | — |
| Day 32 | −5.0 | 86 | 32.64 | 1.65 | — | — |
| Day 40 | −5.0 | 89 | 32.48 | 1.76 | — | — |
| Day 47 | −8.5 | 85 | 33.13 | — | — | — |
| Day 53 | −5.0 | 77 | 33.81 | 1.61 | — | — |
| Day 55 | −5.0 | 86 | 31.76 | 1.86 | 0.12 | 0.46 |
| Slurry 2 | | | | | | |
| Day 1 | −5.0 | 82 | 30.35* | 2.95* | 0.39 | 0.21 |
| Day 2 | −5.0 | 78 | — | — | — | — |
| Day 4 | −5.0 | — | — | — | — | — |
| Day 5 | −5.0 | 76 | 29.98 | 3.10 | — | — |
| Day 19 | −5.0 | 78 | 30.25 | 2.79 | — | — |
| Day 26 | −5.0 | 78** | 29.23 | 3.16 | — | — |
| Day 28 | −5.0 | — | — | — | — | — |
| Day 29 | −5.0 | — | — | — | — | — |
| Day 32 | −5.0 | 77 | 30.54 | 2.88 | — | — |
| Day 40 | −5.0 | 75 | 30.73 | 2.89 | — | — |
| Day 47 | −8.5 | 78 | 28.93** | — | — | — |
| Day 53 | −5.0 | 70 | 29.43 | 3.16 | — | — |
| Day 55 | −5.0 | 83 | 29.58 | 3.00 | 0.34 | 0.27 |
| Slurry 3 | | | | | | |
| Day 1 | −5.0 | — | — | — | — | — |
| Day 2 | −5.0 | — | — | — | — | — |
| Day 4 | −5.0 | 79 | 32.17* | 3.41* | 0.20 | 0.25 |
| Day 5 | −5.0 | 82 | 31.71 | 3.50 | 0.22 | 0.23 |
| Day 19 | −5.0 | 78 | 31.05 | 3.64 | — | — |
| Day 26 | −5.0 | 83 | 31.76 | 3.40 | — | — |
| Day 28 | −5.0 | — | — | — | — | — |
| Day 29 | −5.0 | — | — | — | — | — |
| Day 32 | −5.0 | 78 | 31.79 | 3.41 | — | — |
| Day 40 | −5.0 | 77 | 31.98 | 3.62 | — | — |
| Day 47 | −8.5 | 83 | 32.04 | — | — | — |
| Day 53 | −5.0 | 72 | 30.11 | 3.76 | — | — |
| Day 55 | −5.0 | 86 | 31.83 | 3.40 | 0.15 | 0.33 |
| Slurry 4 | | | | | | |
| Day 1 | −5.0 | — | — | — | — | — |
| Day 2 | −5.0 | — | — | — | — | — |
| Day 4 | −5.0 | 80 | 31.12* | 4.47* | 0.26 | 0.19 |
| Day 5 | −5.0 | 79 | 30.71 | 4.63 | 0.27 | 0.21 |
| Day 19 | −5.0 | 72 | 30.42 | 4.68 | — | — |
| Day 26 | −5.0 | — | — | — | — | — |
| Day 28 | −5.0 | 70 | 29.98 | 4.67 | — | — |
| Day 29 | −5.0 | — | — | — | — | — |
| Day 32 | −5.0 | 77 | 30.57 | 4.54 | — | — |
| Day 40 | −5.0 | 75 | 30.39 | 4.49 | — | — |
| Day 47 | −8.5 | 78 | 30.21 | — | — | — |
| Day 53 | −5.0 | 68 | 30.26 | 4.63 | — | — |
| Day 55 | −5.0 | 84 | 30.52 | 4.54 | 0.15 | 0.30 |
| Slurry 5 | | | | | | |
| Day 1 | −5.0 | — | — | — | — | — |
| Day 2 | −5.0 | — | — | — | — | — |
| Day 4 | −5.0 | — | — | — | — | — |
| Day 5 | −5.0 | — | — | — | — | — |
| Day 19 | −5.0 | — | — | — | — | — |
| Day 26 | −5.0 | — | — | — | — | — |
| Day 28 | −5.0 | — | — | — | — | — |
| Day 29 | −5.0 | 80 | 30.46 | 6.13 | 0.20 | 0.35 |
| Day 32 | −5.0 | — | — | — | — | — |
| Day 40 | −5.0 | 83 | 31.00 | 5.86 | — | — |
| Day 47 | −8.5 | 87 | 30.62 | — | — | — |
| Day 53 | −5.0 | 78 | 31.11 | 5.78 | — | — |
| Day 55 | −5.0 | 89 | 30.32 | 6.32 | 0.19 | 0.37 |

The five slurries had the following ranges:

| Sample | wt % NaOCl | wt % NaCl |
|---|---|---|
| Slurry 1 | 31.67-33.41% | 1.56-1.76% |
| Slurry 2 | 29.23-30.73% | 2.79-3.16% |
| Slurry 3 | 31.05-32.17% | 3.41-3.64% |
| Slurry 4 | 29.98-31.12% | 4.47-4.68% |
| Slurry 5 | 30.46-31.00% | 5.86-6.13% |

It is notable that these ranges do not imply a trend. Numbers obtained for concentrations of NaOCl and NaCl appeared to change with each round of analysis and with no apparent trend. The sampling method employed, although largely effective, may have resulted in some inconsistency of sampling and thus more measurement error. As a result, changes observed may not be solely due to physical or chemical changes in the slurries, but due to sampling method. The fraction of solids was also measured to determine if a representative sample was removed for analysis. (Theoretically, if a representative sample is removed, the percentage of solids should remain the same even if the overall volume of the slurry decreases).

During the last two weeks of storage, the samples were held at a variety of storage temperatures, ranging from −9.1° C. to +2° C. After holding the sample at a constant temperature for at least 24 hours, the fraction settled solids in the sample was observed. The sample was then stirred by hand using a pipet tip and the consistency was gauged on a subjective 1-10 scale along with visual observations.

| Date | Temp (° C.) | % Solids | Ratings | Comments |
|---|---|---|---|---|
| Slurry 1 | | | | |
| Day 41 | −5 | — | 3 | |
| Day 42 | −7 | 89 | 3 | — |
| Day 43 | −8.8 | 89 | 4 | Takes longer to slump down after stirring. Slurry sticks to slide more. Definite impressions left by stirring. |
| Day 48 | −9.1 | 89 | 5 | Takes longer to slump down after stirring - even more than before (−8.8) according to Aw uri. Slurry sticks to |

-continued

| Date | Temp (° C.) | % Solids | Ratings | Comments |
|---|---|---|---|---|
| | | | | the sides. Definite impressions left by stirring. |
| Day 49 | −6 | 85 | 4 | Most viscous Slurry slowly slumps down after being stirred. Raising temp seems to have decreased viscosity. |
| Day 50 | −3 | 81 | 3 | Slight impressions made while stirring. Slurry slumps down after being stirred. Less viscous than day before. |
| Day 53 | −5 | 81 | 3 | Settled quickly, some impressions made while stirring. |
| Day 54 (A.M) | 0 | 74 | 2 | Settled quickly, stirring impressions do not last. |
| Day 54 (P.M) | 2 | 73 | 1.5 | Nothing to break up at first - no real resistance. Feel some solids. |
| Slurry 2 | | | | |
| Day 41 | −5 | — | 1 | Rating by D. Cawlfield |
| Day 42 | −7 | 80 | 2 | — |
| Day 43 | −8.8 | 75 | 3 | Less viscous than slurry 1. Slight impressions made while stirring but slurry slumps down afterwards. |
| Day 48 | −9.1 | 75 | 3 | Less viscous than slurry 1. Slight impressions made while stirring but slurry slumps down afterwards. |
| Day 49 | −6 | 75 | 2.5 | Slurry slumps down after being stirred. Impressions disappear quickly. |
| Day 50 | −3 | 75 | 2 | No impressions made while stirring. Less viscous than day before. |
| Day 53 | −5 | 75 | 2 | Not very viscous. 2 Layers possible - some fluffy crystals on top. |
| Day 54 (A.M) | 0 | 68 | 1 | After breaking up it becomes very thin - can feel some solids however. |
| Day 54 (P.M) | 2 | 68 | 0.5 | Very thin - crystals don't stick to sides of beaker. |
| Slurry 3 | | | | |
| Day 41 | −5 | — | 1 | Rating by D. Cawlfield |
| Day 42 | −7 | 79 | 2.5 | — |
| Day 43 | −8.8 | 77 | 3 | Less viscous than slurry 1. Slight impressions made while stirring but slurry slumps down afterwards. |
| Day 48 | −9.1 | 77 | 3 | Same as slurry #2 - again with slight impressions. |
| Day 49 | −6 | 80 | 2.5 | Slurry slumps down after being stirred. Impressions disappear quickly. |
| Day 50 | −3 | 76 | 2 | No impressions made while stirring. Less viscous than day before. |
| Day 53 | −5 | 80 | 2.5 | More viscous than 2 & 4. Settled quickly. |
| Day 54 (A.M) | 0 | 66 | 1 | After breaking up it becomes very thin - can feel some solids however. |
| Day 54 (P.M) | 2 | 67 | 0.5 | Very thin - crystals don't stick to sides of beaker. |
| Slurry 4 | | | | |
| Day 41 | −5 | — | 0.5 | Rating by D. Cawlfield |
| Day 42 | −7 | 78 | 2 | — |
| Day 43 | −8.8 | 75 | 2.5 | Least viscous. Easiest to stir. Slurry readily slumps down after stirring. |
| Day 48 | −9.1 | 79 | 2.5 | Least viscous. Easiest to stir. Slurry readily slumps down after stirring. |
| Day 49 | −6 | 71 | 2.5 | Slurry slumps down after being stirred. Impressions disappear quickly. |
| Day 50 | −3 | 74 | 2 | No impressions made while stirring. Less viscous than day before. |
| Day 53 | −5 | 78 | 2 | Settled quickly - not very viscous. |
| Day 54 (A.M) | 0 | 69 | 1 | Feels watery - little to no resistance when stirring. |
| Day 54 (P.M) | 2 | 65 | 1 | No real resistance of beginning of stirring. |
| Slurry 5 | | | | |
| Day 41 | −5 | — | 2 | Rating by D. Cawlfield |
| Day 42 | −7 | 87 | 3 | — |
| Day 43 | −8.8 | 83 | 3.5/3 | Similar to slurry #1, but appears slight less viscous. |
| Day 48 | −9.1 | 83 | 3.5 | Similar to slurry #1, but appears slightly less viscous. |
| Day 49 | −6 | 84 | 3 | Slightly more viscous than other slurries. Slight impressions made while stirring, but slurry slumps down after being stirred. |
| Day 50 | −3 | 84 | 2.5 | Slightly more viscous than slurries 2.3 & 4. |
| Day 53 | −5 | 81 | 3 | Some resistance - more solids feel-some impressions that disappear quickly. |
| Day 54 (A.M) | 0 | 77 | 1.5 | More viscous than 2-4 but less than 1. More resistance to stirring than "Is". |
| Day 54 (P.M) | 2 | 73 | 1.5 | Easy to break up - feel some solids. |

The results of the tests in this second example verify that the slurry's pumpable handling properties are retained even after heating and cooling cycles within the ranges specified. When the slurry's composition contained higher concentrations of NaCl, the fraction solids and the physical properties were more consistent as the sample was warmed or cooled, as also claimed. All slurry samples lost less hypochlorite strength over time than would be expected for a solution of 24 wt % hypochlorite held at temperatures above which pentahydrate crystals would precipitate.

Example 3

A sample of hypochlorite solution having about 28% sodium hypochlorite, 7% sodium chloride, and 0.6% sodium hydroxide was cooled to 0 degrees C. Formation of pentahydrate crystals was initiated by adding a few sodium hypochlorite pentahydrate crystals previously prepared. The mixture rapidly formed a network of crystals and became semi-solid. A 500 gram sample of this semi-solid mixture was added to a laboratory mill containing titanium blades approximately 3 inches in radius impelled by a central shaft at 2000 RPM. Samples were taken for inspection initially, and after 5, 10, and 20 seconds of milling. Microscopic inspection of the crystals and measurement of the L/D ratio shows that milling breaks the longest crystals, producing a pourable slurry. Samples of this slurry were also allowed to settle. Clear liquor from the samples was poured off, and the remaining pourable slurry was analyzed, demonstrating that increased concentration was now possible. A summary of the results are shown in the following table.

|  | Sample | | | |
| --- | --- | --- | --- | --- |
|  | 3A | 3B | 3C | 3D |
| Milling time seconds | 0 | 20 | 30 | 50 |
| Average Length um | 1898 | 600 | 500 | 503 |
| Average Diameter um | 98 | 105 | 109 | 113 |
| Average L/D ratio | 19.4 | 5.7 | 4.6 | 4.5 |
| Hypochlorite in Settled Slurry wt % | 27.3 | 36.6 | 34.6 | 35.6 |

Example 4

A sample of low-salt sodium hypochlorite solution was cooled and seeded to produce crystals of sodium hypochlorite pentahydrate as in Example 3 to produce a paste-like material. The initial paste was milled for 30 seconds at 2000 rpm in the same mill described in Example 3 to produce a slurry. This slurry was then filtered on a vacuum filter and the cake was then milled again for another 30 seconds. The filter cake became a thick slurry which was filtered yet again, and the resulting cake was milled again. The final slurry so prepared was analyzed and found to contain 37 wt % sodium hypochlorite and the crystals were observed to have an average length of 400 microns and an average diameter of 110 microns. This slurry was diluted with DI water to obtain slurries of a range of concentrations from 32% to 35% by weight. These slurries were placed in a Brookfield viscometer and the viscosity measured with the following results at 0.09 degrees C.:

| % NaOCl | % Torque | 100/RPM | TK | SMC | (cP) Viscosity |
| --- | --- | --- | --- | --- | --- |
| 35.5 | 37 | 5 | 1 | 53.5 | 9897.5 |
| 35.0 | 34 | 5 | 1 | 53.5 | 9095.0 |
| 34.5 | 27 | 5 | 1 | 53.5 | 7222.5 |
| 34.0 | 15 | 5 | 1 | 53.5 | 4012.5 |
| 33.5 | 11 | 5 | 1 | 53.5 | 2942.5 |
| 33.0 | 8 | 5 | 1 | 53.5 | 2140.0 |
| 32.5 | 7 | 5 | 1 | 53.5 | 1872.5 |

RPM setting for experiment 20
Spindle vane V-73 SMC 53.5
Viscometer model RV 1
bath temp degrees C. 0.09

In this example, all of the slurries produced were judged to have a viscosity low enough to be pumped and handled using conventional pumps and piping normally used for bleach solutions, albeit at flow rates lower than expected for conventional bleach solutions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departurerom the disclosure, and all such modifications are intended to be included within the scope of the disclosure.

What is claimed is:

1. A sodium hypochlorite composition comprising sodium hypochlorite pentahydrate crystals and a mother liquor saturated in sodium hypochlorite, comprising between about 25% and about 40% by weight sodium hypochlorite, and sodium chloride, in amount between at least 3.5% and about 10% by weight.

2. The composition according to claim 1 further comprising an alkali to stabilize the composition.

3. The composition according to claim 2, wherein the alkali is at least one of sodium hydroxide and sodium carbonate.

4. The composition according to claim 3 wherein the alkali comprises between about 0.01% and about to 3% by weight of the composition.

5. The composition according to claim 1, wherein the size (longest dimension) of the sodium hypochlorite pentahydrate crystals is less than about 1 mm.

6. The composition according to claim 5, wherein the size (longest dimension) of the sodium hypochlorite pentahydrate crystals is less than about 0.5 mm.

7. The composition according to claim 6, wherein the size (longest dimension) of the sodium hypochlorite pentahydrate crystals is less than about 0.1 mm.

8. The composition according to claim 6, wherein the size of the sodium hypochlorite pentahydrate crystals is sufficiently small to maintain a suitable viscosity.

9. The composition according to claim 1 wherein the average length to diameter ratio of the sodium hypochlorite pentahydrate crystals is less than about 20:1.

10. The composition according to claim 9 wherein the average length to diameter ratio of the sodium hypochlorite pentahydrate crystals is less than about 6:1.

11. The composition according to claim 1 wherein the composition is at a temperature of between about −15° C. and about 10° C.

12. The composition according to claim 11 wherein the composition is at a temperature of between about −10° C. and about +5° C.

13. The composition according to claim 1 wherein the sodium chloride composition is at least 7%.

* * * * *